J. Branique.
Musical Tablet.

No. 71,359. Patented Nov. 26, 1867.

Witnesses:
Chas H Smith
Geo V Walker

Inventor:
John Branique

United States Patent Office.

JOHN BRANIQUE, OF NEW YORK, N. Y.

Letters Patent No. 71,359, dated November 26, 1867.

---

MUSICAL TABLET.

---

*The Schedule referred to in these Letters Patent and making part of the same.*

---

TO ALL WHOM IT MAY CONCERN:

Be it known that I, Dr. JOHN BRANIQUE, of the city and State of New York, have invented and made a certain new and useful Musical Tablet; and I do hereby declare the following to be a full, clear, and exact description of the said invention, reference being had to the annexed drawing, making part of this specification, wherein—

Figure 1:
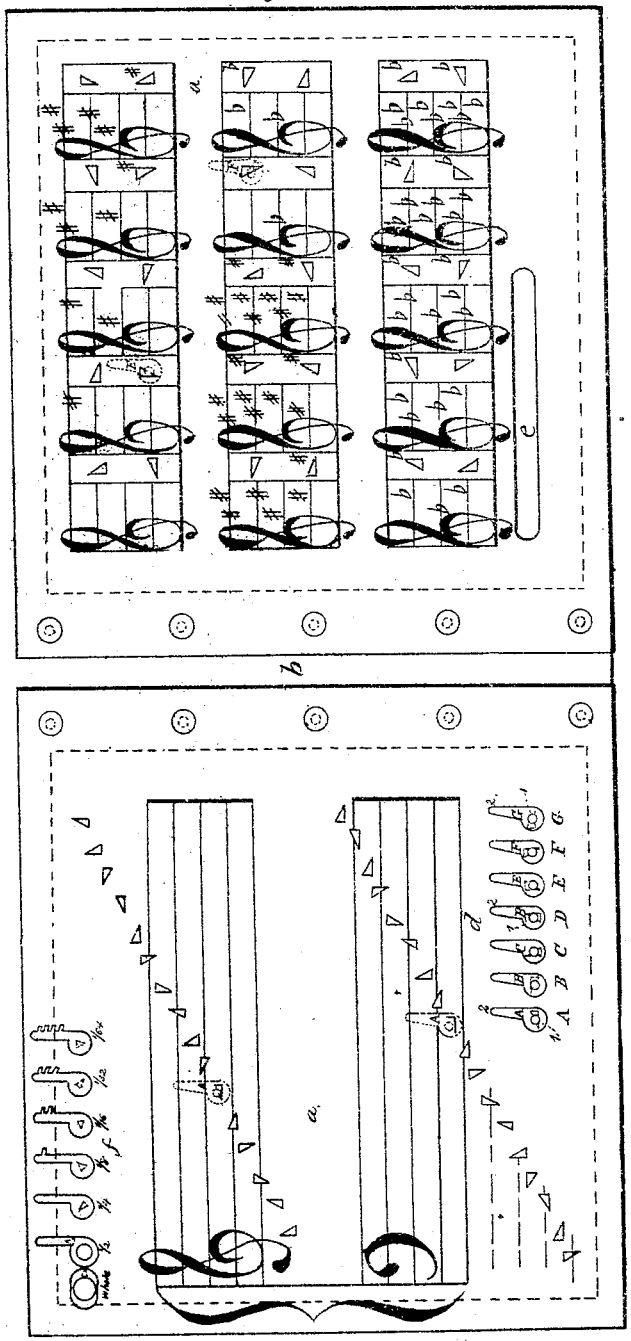
Figure 1 is a view of said musical tablet as open.
Figure 3:
Figure 3 is a perspective view of one of the note-pegs.
Figure 2:
Figure 2 is a sectional view of the same as closed.

In teaching music, to young children particularly, difficulty exists in impressing on the mind the value of the various notes, and the letters upon the lines and spaces of the treble and bass clefs, and the key-notes of the major and minor scales.

My invention consists in a tablet, provided with movable note-pegs, so constructed that only the correct note can be set into an opening in the clef allotted for it. The note-pegs are each formed with a polygonal base, (I prefer triangular,) standing in such a position to the note that if the said base is placed in the opening in the tablet allotted for it, the note stands vertically, but if an attempt is made to put the note into the wrong opening, the note-peg will stand at an inclination. By this device there is both instruction and amusement in the effort made to discover which note-peg belongs to a given space or line of the scale, or to discover which is the key-note of the major or minor scale.

In the drawing, the tablet is shown as a metal plate, $a$, made in two parts, each being supported by a surrounding wooden frame, and $b$ is a strip of leather or other device for uniting the two parts, and forming a hinge, so that the tablet can be shut up. On the left side of the tablet I mark, by engraving or otherwise, the treble and bass clefs, with the lines and spaces above and below. I provide a row of note-pegs, as at $d$, each peg being formed with a handle-end, 1, an arm, 2, and a prismatic base, 3, and being marked with its appropriate letter. The lines and spaces of the clef are perforated with a polygonal opening, of the size and shape of the base of the note, and the position of these openings corresponds with the given note-peg of the particular line or space, and no other, as will be visible on inspection. The left side of the tablet is slotted, as at $e$, to pass the handle-ends of the note-pegs when they are in their places in the row $d$. I make use of a row of illustrative notes, shown at $f$, the same representing whole notes, half notes, quarters, sixteenth, thirty-second, and sixty-fourth characters. These may be movable, and provided with polygonal bases, as heretofore mentioned, so that the learner can be impressed with the character by the effort to discover its position. On the right side of the tablet, I provide a key-note scale-board, showing the different sharps and flats in the various scales; and the key-note of the minor and major scales is denoted by the polygonal opening in the plate to receive the given key-note of the scale, from the row $d$, and no other, so that the name of the scale will be correctly indicated by the note that will fit into the opening provided for the particular key-note of the minor and major scales.

What I claim, and desire to secure by Letters Patent, is—

The musical tablet, provided with the movable note-pegs, substantially as and for the purposes set forth.

In witness whereof I have hereunto set my signature, this thirteenth day of June, A. D. 1867.

JOHN BRANIQUE.

Witnesses:
 CHAS. H. SMITH,
 GEO. D. WALKER.